United States Patent [19]

Stubbings

[11] 4,047,457
[45] Sept. 13, 1977

[54] SHEET METAL CUTTING
[75] Inventor: James Henry Stubbings, Rockville, Md.
[73] Assignee: Potomac Applied Mechanics, Inc., Bethesda, Md.
[21] Appl. No.: 630,894
[22] Filed: Nov. 11, 1975
[51] Int. Cl.² ............................................. B26D 5/00
[52] U.S. Cl. ........................................ 83/71; 83/916; 83/925 CC
[58] Field of Search ..................... 83/71, 925 CC, 916

[56] References Cited
U.S. PATENT DOCUMENTS

| | | | |
|---|---|---|---|
| 3,728,927 | 4/1973 | Pfleiderer | 83/916 X |
| 3,730,634 | 5/1973 | Gerber et al. | 83/925 CC |
| 3,766,813 | 10/1973 | Pearl | 83/925 CC |
| 3,790,154 | 2/1974 | Gerber et al. | 83/451 X |

Primary Examiner—Willie G. Abercrombie
Attorney, Agent, or Firm—Cushman, Darby, Cushman

[57] ABSTRACT

Pattern cutting of sheet metal is effected automatically. Conveyors move a metal sheet into a pattern cutting position, the sheet being guided exactly into position. The sheet is clamped securely in pattern cutting position and a cutting tool begins cutting the pattern from the sheet. The cutting tool is movable in $x$, $y$, and $a$ directions so that any type of pattern may be cut thereby. The tool may comprise a scissors-like shearer, one blade being provided above the horizontal sheet being cut, and another blade being disposed below the sheet. Supporting tips are mounted on the conveyor to support the metal sheet in cutting position while preventing damage to the conveyor during cutting. A notcher is also provided movable along each side edge of the metal sheet the notchers being adjustable with respect to each other to accommodate sheets of different widths. The $x$, $y$, $a$, and notcher motors are all controlled by a computer. After pattern cutting, the conveyor is started up and the cut sheet transported away from the pattern cutting position, the pattern cut from the sheet being supported while the waste portions of the sheet fall into a waste bin or the like.

30 Claims, 10 Drawing Figures

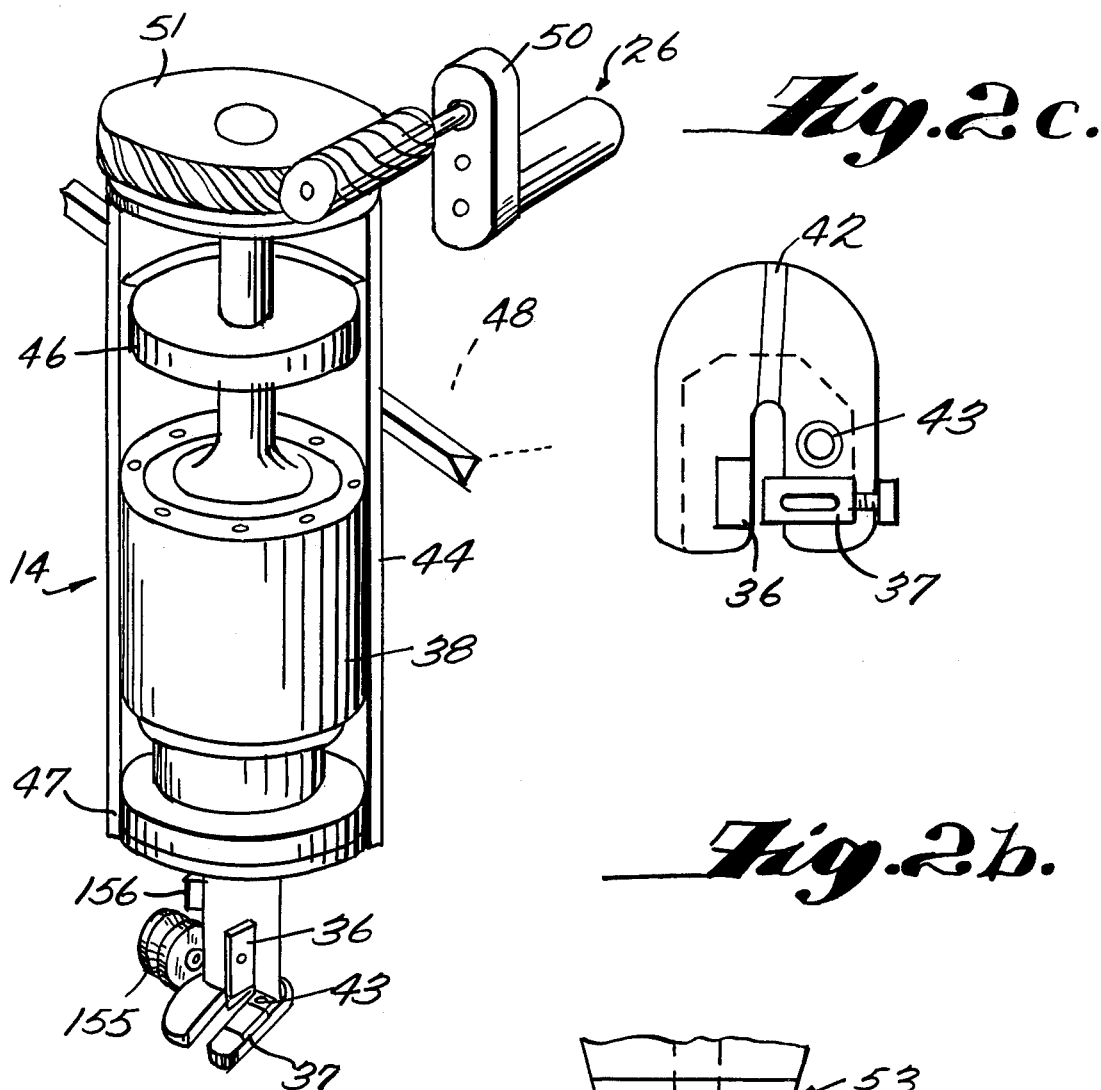
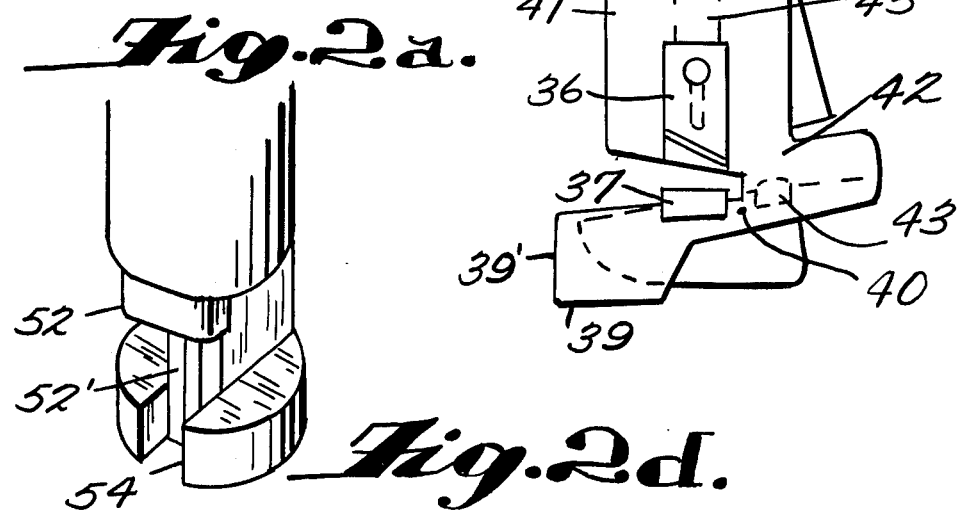

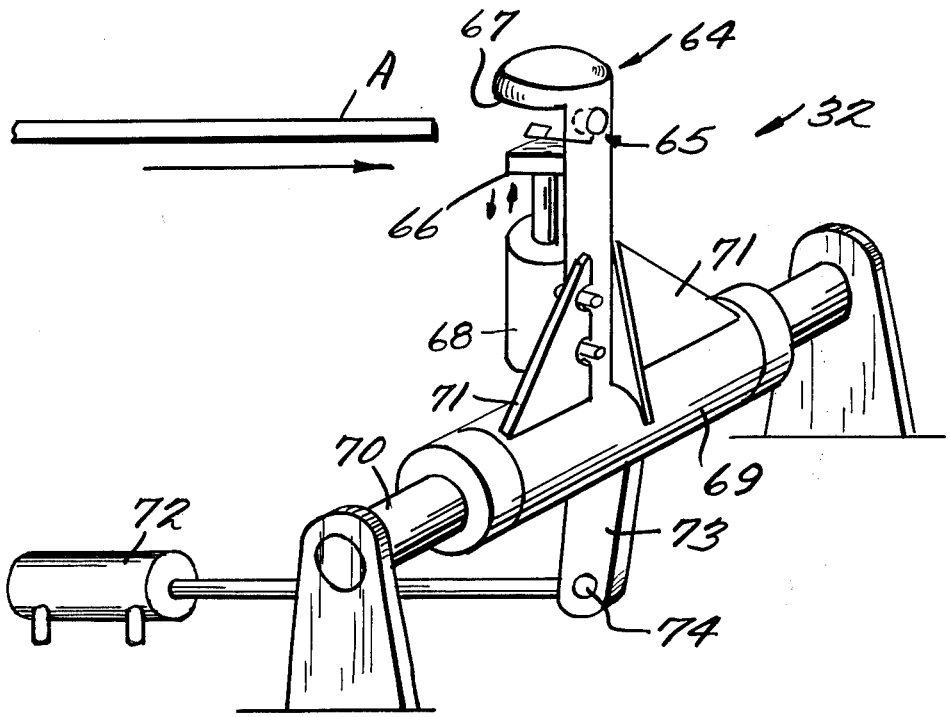
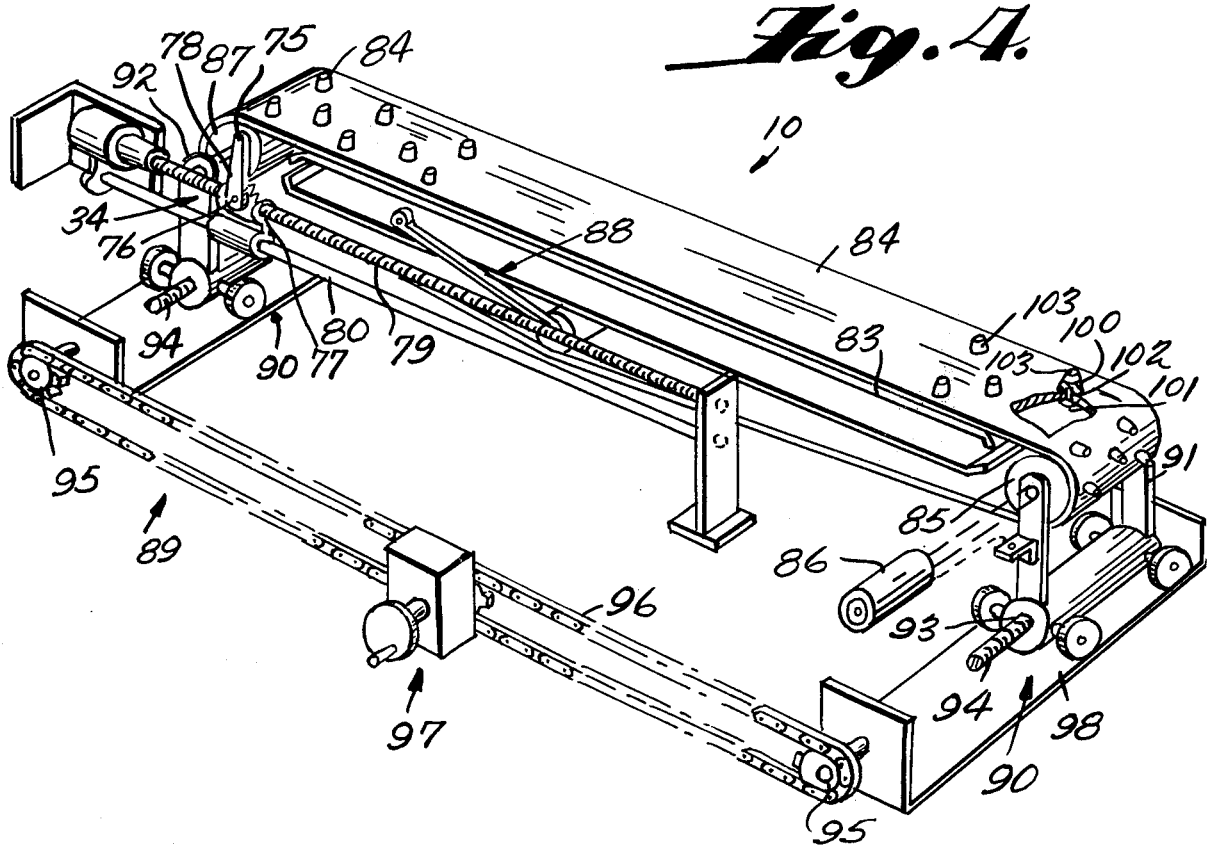

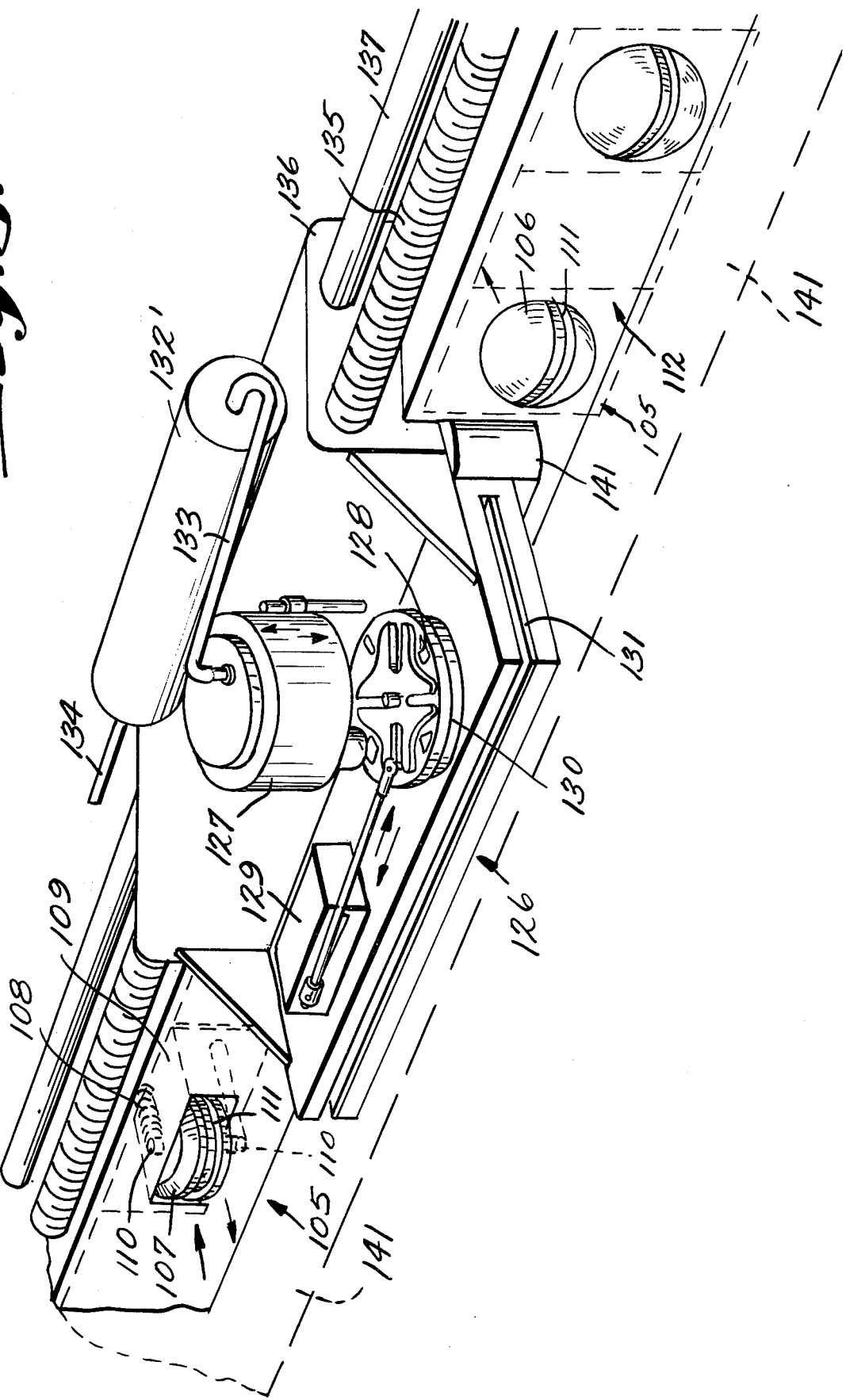

From an inspection of the detailed description of the invention, and from the appended claims.

SHEET METAL CUTTING

BACKGROUND AND SUMMARY OF THE INVENTION

The invention relates to a method and apparatus for automatically cutting sheet metal into patterns for forming ductwork, etc. Conventionally, such pattern cutting of sheet metal is done by hand, and is very labor intensive, relatively slow, and requires a large number of skilled laborers to achieve acceptable large volume production. While systems are known for cutting sheet material in general into patterns, such systems really have not been adapted so that they could function in cutting sheet metal of a wide variety of gauges and widths as is necessary when pattern cutting sheet metal for making ductwork, etc.

A number of prior art devices made by Gerber Garment Technology, Inc., such as shown in U.S. Pat. Nos. 3,477,322, 3,370,634, 3,776,074, 3,790,154, and 3,841,187, among others, are successful in cutting patterns in sheet material such as cloth, paper, and the like, however, the cutting means employed by such devices do not, it is believed, provide for easy adaptation to cutting of sheet metal, and large production thereby is usually based on cutting a large stack of sheets all at the same time—not practical with sheet metal—rather than by automatic conveyance of the sheet material into a cutting position.

According to the present invention, automatic pattern cutting of sheet material is practical; something that heretofore has not been practical. According to the present invention a metal sheet is automatically conveyed by conveying means into a pattern cutting position, guidance thereof being provided, and the metal sheet is then automatically clamped into place at the pattern cutting position. A cutting means, which preferably comprises a shear cutter, has one blade thereof being adapted to be disposed above the horizontally disposed metal sheet, and the other blade thereof being adapted to be disposed below the horizontally disposed metal sheet. Supporting means associated with the conveying means support the metal sheet in proper position to allow positioning of the lower blade below the metal sheet for cooperation with the upper blade, and such supporting means prevent damage to the conveying means during the pattern cutting operation. The pattern cutting is controlled by a computer which activates means for moving the cutting means to any x-y coordinate of the horizontal metal sheet, and activates a motor for moving the cutting blades to any angular, α, position.

The cutting means cuts into the metal sheet through a free edge thereof, and cuts any desired pattern. A ball bearing can be provided associated with the lower blade member to allow more exact control of the angular position of the cutting means (especially when right angles or tight curves must be cut). After cutting of the desired pattern from the metal sheet, the clamping means are automatically released, the conveying means started, and the sheet moved away from the pattern cutting position. The sheet may be passed over a roller and the pattern held on the roller while the waste cuttings fall into a waste bin disposed below the roller.

Notching of the metal sheet being pattern cut can also be effected automatically, notches often being necessary at predetermined locations along the edges of a pattern to allow for folding of the sheet to form ductwork, etc. Notching is effected by a notching assembly movable along each side edge of the metal sheet, the notching assemblies receiving the sheet between top and bottom plates thereof. The notching assemblies are controlled by the computer also, as is an indexer for each for bringing a selected one of a plurality of notching dies into operative relationship with the notching punch. The notching assemblies are movable with respect to each other in the direction perpendicular to the feed direction of the metal sheets to accommodate sheets of different widths, and shims may be provided therewith to accommodate sheets of different gauge.

It is the primary object of the present invention to provide a method and apparatus for effecting the automatic pattern cutting of sheet metal. This and other objects of the invention will become clear from an inspection of the detailed description of the invention, and from the appended claims.

BRIEF DESCRIPTION OF THE DRAWINGS

FIGS. 2a-2c are perspective, side, and top views, respectively, of an exemplary cutting means utilizable according to the present invention, and FIG. 2d is a side view of a modified form of cutting means that could be employed in the apparatus of FIG. 1;

FIG. 3 is a detail view of clamping means utilizable in the apparatus of FIG. 1 for holding a metal sheet to be cut in pattern cutting position;

FIG. 4 is a detail perspective view of exemplary conveying means utilizable in the apparatus of FIG. 1;

FIG. 5 is a detail perspective view of an exemplary notching assembly according to the present invention, with guide means cooperating therewith;

DETAILED DESCRIPTION OF THE INVENTION

Figure 1:
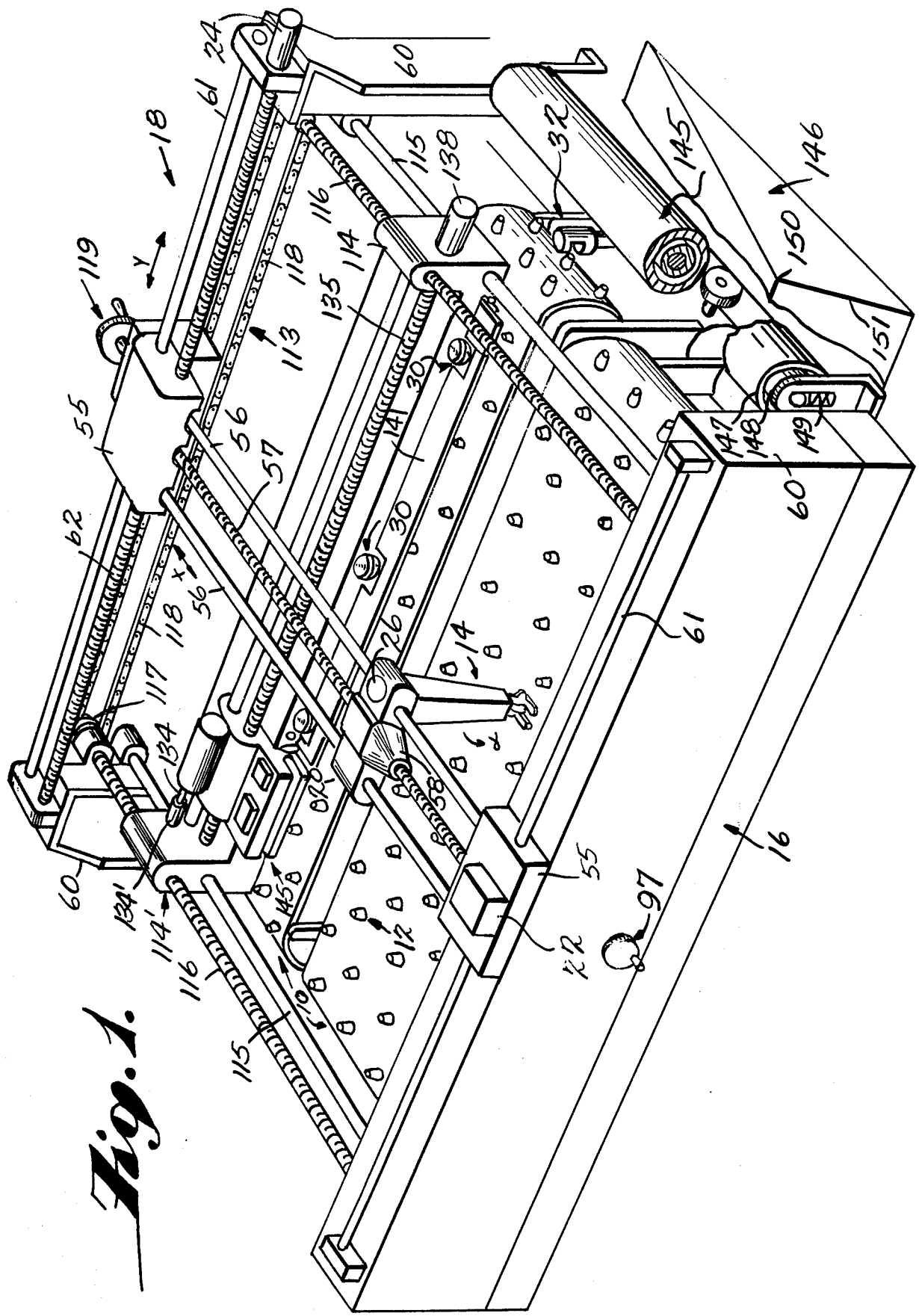
FIG. 1 is a perspective view of exemplary apparatus for automatic pattern cutting of sheet metal according to the present invention.

An exemplary automatic sheet metal cutter according to the present invention is shown in FIG. 1. The apparatus according to the present invention includes the major components of a conveying means 10 for conveying a sheet of metal to be pattern cut into a pattern cutting position (see FIG. 7), the conveying means 10 having supporting means 12 associated therewith for supporting the sheet of metal thereon in a manner to prevent damage to the conveying means during pattern cutting of the sheet of metal, a scissors cutting tool means 14 for shearing the sheet of metal to pattern cut it, means 16, 18 for supporting the cutting tool means 14 above the sheet of metal to be pattern cut so that the cutting tool means 14 is in operative cutting position with the sheet of metal, and so that the cutting tool means 14 may be moved in $x$ and $y$ horizontal directions substantially perpendicular to each other, means 20 for supporting the cutting tool means for substantial 360° angular - α - movement about a vertical axis $z$, an $x$ motor 22, a $y$ motor 24, and a α motor 26 for automatically moving the cutting tool means 14 in the $x$, $y$, and α directions, respectively, computer control means 28 (see FIG. 6) for automatically controlling the operation of the x, y, and α motors 22, 24, and 26, respectively for moving the cutting tool means 14 to cut a desired preprogrammed pattern from the metal sheet, guide means 30 for guiding the movement of the sheet into pattern cutting position, and clamping means shown generally at 32 and 34, for holding the sheet of metal stationary at its pattern cutting position during pattern cutting thereof. Each of the individual components of the sheet metal cutter may take a number of forms to accomplish pattern cutting of the sheet metal, the following specific embodiments thereof merely being preferred.

The cutting tool means 14 is shown in more detail in FIGS. 2a-2c. The actual cutting portion of the means 14 includes a pair of blade members 36, 37 for shearing of the metal sheet received therebetween, one blade member 36 being disposed above a horizontally arranged piece of sheet metal to be cut and shearing the metal by penetrating through the top surface thereof, and the other blade member 37 being disposed below the horizontally arranged piece of sheet metal and shearing the metal by penetrating through the bottom surface thereof. The exact structure of the cutting portions may be varied—for instance only one of the blade members 36, 37 may be moved during cutting, or both may be moved during cutting—however one exemplary cutter that may be adapted for use in the present invention is sold under the name Unishear and is manufactured by Stanley, and another is manufactured by Black and Decker (i.e. Stanley 90 218 (U218), and Black and Decker No. 3210). A motor 38 powers the movement of the blade 36 during cutting, and in the embodiment shown in the drawings moves upper blade member 36 downwardly while blade 37 remains stationary. An arm 39 mounts blade member 37, the arm 39 having a leading portion 39' thereof, and a generally flat upper surface for engaging the bottom of the sheet. A stationary guide member 41 which allows reciprocation of blade 36 therein and mounts arm 39, has a V-notch formed in the front end thereof, being so shaped to facilitate movement of the sheet metal to be cut into position between the blades 36, 37. The member 41 has only a thin vertical portion 42 connecting the enlarged upper and lower portions thereof which are adapted to be disposed above and below the sheet of metal to be cut, the portion 42 being adapted to pass through the cut made in the metal sheet by the cutting blades 36, 37. According to an important aspect of the present invention, a ball bearing 43 (which may be spring-mounted) is provided on arm 39 adjacent the trailing edge of blade 37 for engaging the bottom surface of the sheet of metal to be pattern cut to facilitate powered movement of the cutting portion through the sheet metal. This is especially important wherein sharp turns are necessary during pattern cutting, especially since the cutting operation is automatic. The ball bearing provides a point of engagement on the metal sheet to allow for sharp rotation of the cutting tool means 14 about the vertical axis z. It is noted that the ball bearing arrangement may be provided on any cutter, a hand automatic cutter, or an automatic cutter such as according to the present invention. It is also noted that the arm 39 could be made as a lever, pivotal about a horizontal axis through a pivot point 40, and the motor 38 could both reciprocate blade 36 and pivot lever 39, resulting in a simultaneous movement of the blades toward each other during cutting. The ball bearing 43, in such a case, would be disposed adjacent pivot 40 on the opposite side thereof as blade 37.

The motor 38 of the cutting tool means 14 is mounted within a housing 44 on a shaft 45, a bearing 46 being provided on the top of the motor 38 for receiving shaft 45, and a bearing 47 being provided on the bottom of the motor 38 for receiving shaft 45, the shaft 45 being directly connected to stationary member 41 mounting the blade members 36, 37. The housing 44 is stationarily mounted on a cross-member 48 which is part of mounting means 20, as by keys 48', which cross-member 48 also mounts the α motor 26 for rotating the cutting tool means in the α direction. Although any suitable arrangement may be utilized, it is desired that the stepping α motor 26 turn a worm 49 through a gear box 50, which worm 49 in turn rotates gear 51 attached to the top of shaft 45, the gear 51 and shaft 45 being rotatable about the z axis. Signals to α motor 26 during the pattern cutting operation will cause rotation of the shaft 45 to position the cutting blades 36, 37 in the correct position for cutting of the desired preprogrammed pattern.

While the scissors-type cutting tool described above with reference to FIGS. 2a-2c is preferred, for certain heavier gauge sheet steel, it may be necessary to use a nibbler-type cutting tool to effectively cut patterns in the sheet metal. Such a nibbler-type cutting tool may have a head like that shown in FIG. 2d at 52. The head 52 includes a punching portion 52' that reciprocates up and down, punching a small hole with each reciprocation. A slotted plate 54 is provided on the head 52 below a sheet of metal to be cut to insure proper punching of a plug of metal while the surrounding metal is not disturbed. The nibbler head 52 may be interchangeable with the scissors-type cutting head shown in FIGS. 2a-2c, a releasable connection being provided at 53, or the whole motor and cutting head arrangement may be replaced when it is desired to change from nibbler to scissors cutter and vice versa. In such a case, the nibbler motor will also have keys 48' associated therewith, and it may merely be slipped into operative engagement with cross-member 48 after the scissors-type cutter is removed. Other type cutting heads could also be employed, depending upon the type of material to be cut.

The cutting means 14 is mounted by mounting means 16 and 18 for movement to any particular coordinate of the area covered thereby. The mounting means 16 includes a pair of end members 55 defining the outer extremities of movement in the x-direction, the members 55 being connected by one or more guide rods 56 and a screw-rod 57 or the like. A threaded member 58 of mounting means 20 receives the screw-rod 57 therein and transforms the rotational movement of the screw-rod 57 to linear movement of the mounting means 20 for cutting tool 14, which linear movement is guided by the smooth guide rod(s) 56. x stepping motor 22 is mounted on one of the end members 55, and rotates the screw-rod 57 in response to controls from computer 28.

The mounting means 18 includes a pair of frame members 60 disposed on either end of each end member 55 of the mounting means 16, each pair of frame members 60 having one or more guide rods 61 disposed therebetween as well as a screw-rod 62 disposed between one pair (or both pairs) of frame members 60. The end members 55 of the mounting means 16 receive the guide rod(s) 61 therein, and one of the members 55 has a threaded portion receiving the screw-rod 62 to transform rotational movement of the screw-rod 62 into translational movement of the members 55 in the y direction. The y stepping motor 24 is mounted on one end of the frame members 60 for rotating screw-rod 62, and rotates 62 in response to signal fed to it by computer 28. It is noted that each of the pairs of the frame members 60 must be spaced far enough apart (in the x-direction) so that the scissors blades 36, 37 of the cutting tool can initially engage a side edge of the metal sheet to be cut in order to begin cutting thereof. Alternatively, the bottoms of the frame members 60 could be located relatively close to the proposed edges of the largest sheet of metal to be received by the whole assembly, and the top portions of the frames 60 could then be flared out a large enough distance to allow movement of the cutter tool 14 into proper starting position.

While the mounting means have been described with reference to screw-rods for providing movement of the members 55 and 20 thereof, of course other means could be provided, such as a rack and pinion arrangement or the like.

The clamping means 32, 34 which hold the sheet of metal to be cut stationary in a pattern cutting position, may also take a wide variety of forms, however a preferred form of the clamping means 32 is shown in FIG. 3 The clamping means 32 includes an abutment member 64 for stopping forward movement of the sheet metal, which member 64 has a microswitch 65 or the like mounted therewith. A piston member 66 is movable upwardly in response to sensing of the sheet metal position by the switch 65, and clamps the sheet metal against the upper surface 67 of member 64. Shims could be provided for surface 67 to adapt it to a wide range of gauges of metal to be pattern cut. The cylinder 68 for moving the piston 66 in response to a signal from switch 65 may be any suitable type, such as pneumatic, hydraulic, electrical, or the like. The whole assembly associated with member 64 is mounted on a tube 69 for pivotal movement about shaft 70 which is received by tube 69. Gussets 71 may be provided for connecting the member 64 to tube 69 to minimize the strain on the member 64 from clamping engagement of sheet metal. A power means, such as cylinder 72, is provided attached to tube 69, such as by lever 73 and clevis pin 74, to provide for pivotal movement of the member 64 with respect to the sheet metal to move the clamping means 32 out of the path of travel of the sheet metal after pattern cutting thereof has been completed and clamping thereof has been released. The cylinder 72 is also preferably controlled by the computer 28, and the computer 28 also preferably provides a dual control (with microswitch 65) for the cylinder 68, the computer 28 initiating pivotal movement of the means 32 and releasing of the clamp 66,67 after pattern cutting of a sheet is completed.

It is also desired that an arrangement 34 be provided on the opposite end of the metal sheet to be cut from the clamping means 32 to assist in holding the sheet in position during cutting thereof. Such means 34 preferably takes the form of one or more motorized squaring pins 75 or the like (see FIGS. 1 and 4). Pin 75 is preferably pivotally mounted at 76 on a support 77, pivotal motion thereof in the direction of feed of the metal sheet against a spring bias being provided to allow movement thereof out of the way of the metal sheet, however after movement of the sheet therepast, the pin 75 returns to its vertical position, and is prevented by stop 78 from pivoting in the opposite direction of sheet feed. Support 77 is internally threaded and receives screw-rod 79 therein and is also connected to guide rod 80, rotation of screw-rod 79 by motor 81 being transformed into transverse movement of pin 75 by support 77. After movement of the sheet metal therepast, when the pin 75 is returned to its vertical position, the motor 81 is activated (i.e., automatically, controlled by computer 28) and it moves the pin 75 into abutment with the back edge of the metal sheet, stop 78 preventing pivotal movement of pin 75 in response to such abutting engagement. The pin 75 thus assists the clamping means 32 in holding the sheet material in a stationary pattern cutting position during pattern cutting thereof.

Conveying means 10 preferably comprises a number of individual conveyor belts 84 spaced from each other in the x-direction, although one large conveyor belt could be provided (if the guide means 30 adjustment were properly arranged). Each conveyor belt 84 extends substantially the length of the y distance between the frame members 60, and is powered by a powered roll 85 rotated by a motor 86 or the like. At least one other roll 87 besides powered roll 85 is provided, mounted at the opposite end of the conveyor belt 84 from roll 85, both rolls 85, 87 being rotatable about a horizontal x-axis. A frame 83 is provided. A belt tension adjustment means 88 may be provided to insure powered movement of the conveyor belt during all types of load conditions. Also, it is preferred that the individual conveyor belts 84 to moveable in the x-direction with respect to each other to accommodate metal sheets of varying widths. For instance, if two conveyor belts 84 are provided, they may be mounted for movement to engage portions on either side of the metal sheet to be transported thereby, the amount of gap provided between conveyors 84 being determined by the size of the metal sheet. Should such a gap become too large, of course a third conveyor belt 84 could be provided. Means for moving the conveyor belts 84 with respect to each other in the x-direction may take a wide variety of forms, such as that shown in FIG. 4 generally at 89 for moving one belt 84 while the other belt (cut away in FIG. 4) remains stationary in the x-direction. The means 89 includes a wheel carriage 90 movable in track 98 for mounting each of the supports 91, 92 for the rolls 85, 87, the wheel carriage 90 having a middle portion thereof that is threaded to receive a screw-rod 94 therein. The screw-rod 94 may be rotated by any suitable means, such as gear 95 powered by chain 96 and hand-wheel 97, the portion 93 transforming rotational movement of the rod 94 into transverse movement of the carriage 90 in the x-direction. Of course a wide variety of other means could be employed, such as a rack and pinion and motorized chain-wheel. It is noted that the clamping means 34 is disposed adjacent the stationary belt 84, at the end of travel of the movable belt 84, so that it does not interfere with the movement of the belts, nor they with it. Of course, both belts 84 could be made movable, with a common screw-rod 94 being provided for powering each of them from a middle position to end positions, and the means 34 would be disposed between the belts 84 at the middle stationary position thereof. Control of motor 86 may be effected manually, by microswitch 65, and by computer 28.

The supporting means 12 associated with the conveying means 10 provide support of sheet metal mounted thereon in a manner to prevent damage to the conveying means 10 during pattern cutting of a metal sheet by the cutting tool 14. The supporting means 12 preferably take the form of a plurality of tips 100 removably mounted on conveyor belts 84 over the whole length thereof, and spaced close enough together to provide for secure support of a metal sheet on the tops 103 thereof. Each tip 100 is formed of hard rubber or other sturdy but flexible material, and may be connected to the conveyor 84 by screws 101 and the like, received by interior threaded portions 102 of the tip 100. The tips 100 are high enough to allow passage of the lower blade member 37 and associated structure of the cutting tool 14 between the metal sheet and the top of belt 84 so that no damage results to belt 84 during cutting. Since the tips are elongated and generally in the shape of a truncated cone, and are made of flexible material, they will flex out of the way when engaged by the leading edge of lever 39 and/or the leading edge of member 41 (or the plate 54) as the cutting tool 14 is moved around, whereby damage to them will also be prevented. If some damage does occur to some tips 100, however, the damaged tips may be periodically replaced.

The guide means 30 for guiding the movement of the sheet metal into pattern cutting position preferably include a plurality of guide rollers 105 mounted along either side of a metal sheet to be cut, and in abutting, receiving engagement therewith. While the rollers 105 may take a wide variety of forms, it is preferred that they be in the form of a ball 106 or truncated wheel 107, spring biased into engagement with a side edge of metal sheet by a spring 108 or the like. Guided linear movement of the ball 106 or truncated wheel 107 in housing 109 therefor is provided by any suitable guide means, such as pins 110. Each guide roller 105 has a groove 111 formed therein, the groove 111 being wide enough to receive the largest gauge sheet metal to be cut therein. Shims may be provided for the grooves 111 if desired. In addition to providing guidance for the movement of the metal sheet into pattern cutting position, the means 30 also serve to hold the sheet in place during cutting—acting in conjunction with conveyor tips 100, and clamps 32 and 34 in this regard.

The guide rollers 105 on one side of a metal sheet to be cut are mounted on a support assembly 112 that is movable in the x-direction to accommodate metal sheets of different widths. A preferred means for movably mounting the assembly 112 is shown in FIG. 1 generally at 113, this means 113 being similar to the means 89 for moving the conveyor belts 84 with respect to each other. The means 113 includes a pair of end collars 114 for mounting assembly 112, each collar 114 receiving a guide rod 115 and a screw-rod 116, a threaded interior portion being provided for the portion of collar 114 receiving rod 116 to transform rotational movement of rod 116 into translational movement in the x-direction. The screw-rods 116 may be driven by any suitable means such as gears 117 mounted on the exterior extremities thereof, rotated by a chain 118 driven by handwheel 119.

In addition to mounting the guide rollers 105, each support assembly 112 also supports a notcher assembly 125 which is reciprocal with respect thereto (and with respect to a metal sheet in pattern cutting position) in the y-direction. The notcher assemblies 125 are for making notches in the side edges of the metal sheet to facilitate bending of the pattern cut therefrom along lines between the notches. Each notcher 125 comprises four main components, a guide 126 for receiving the sheet edge to be notched therein, a punch 127—which may be either pneumatically or hydraulically operated—which supplies the punching force for notching, a plurality of notching dies 128, one of which at a time is contacted by the punch 127 to move through the top plate of the guide 126 and form a notch in the metal sheet edge, and an indexer 129 for selecting which die 128 will be used to form a given notch. Although the punch 127 could be made movable to position itself over any one of the dies 128, it is preferred that the punch 127 remain stationary while the dies 128 are moved by the indexer 129 into operative position with the punch 127. Indexing of the dies 128 may be provided by a wide variety of indexers, such as a linear one for moving dies 128 mounted in a linearly movable plate, however the geneva wheel 130 is preferred, the dies 128 being mounted around the periphery of wheel 130, and indexer 129 moving one position each time to rotate a selected die 128 into proper position beneath punch 127. The guide 126 may have a removable shim(s) 131 associated therewith to adapt to metal sheets of different gauge to insure that the sheet is held in place properly during notching. A tank of compressed air 132 or the like, connected to punch 127 by a reelable hose 133 or the like, may provide the power for operating punch 127. Alternatively, the punch 127 could have provided therewith a tank 132' which tank has a large enough capacity to complete all the required notching in a full traverse of one sheet metal length, and then it could pick up a new supply of air at either end of the path of travel, such as by a male member 134 associated with tank 132' which cooperates with a female member 134' at either end of the path of travel, the members 134' being connected up to a large supply tank (such as tank 132).

Each notcher 125 is moved in the y-direction along the edge of a metal sheet to be cut by a rotatable screw-rod 135 or the like, the rod 135 being received by a threaded portion of support 136 for the notcher 125. A guide rod(s) 137 also should be received by support 136 for guiding the linear movement of assembly 125 in the y-direction as the rotation of rod 135 is transformed to translational movement by the threaded portion of support 136. A notcher motor 138 is provided for each notcher assembly 125, the motors 138 being controlled by the computer 28 along with the x, y, and α motors (22, 24, and 26, respectively). In order to prevent interference with the notcher movement by the guide rollers 105, a leading cam edge 140 is provided on each side of notcher 125. The cam edge 140 engages the ball 106 or wheel 107 and moves it into housing 109 against the bias of spring 108, the range of travel of the roller 105 in the housing 109 being large enough to allow the notcher 125 to move therepast. Notching can take place simultaneously with pattern cutting by tool 14, or after pattern cutting has been completed.

Optionally, hinge plates 141 may be provided to cooperate with rollers 105 to form guide means 30 for insuring proper guidance of the material into proper cutting position. Hinge plates 141, one being associated with each support 112, are pivotally mounted for 90° movement from a first position wherein they are disposed in a substantially horizontal plane, supporting sheet metal conveyed by conveying means 10 so that it is received within the grooves 110 formed in the rollers 105, to a second position wherein they are disposed in substantially vertical planes and will not interfere with operation of notchers 125. Any suitable means, such as hydraulic cylinders, may be employed for moving the hinge plates between such first and second positions, such means being shown schematically at 142 in FIG. 6. The control of the hinge plates to move them into the horizontal first position may be provided by microswitch 65 associated with clamping means 32. When microswitch 65 is not actuated, the means 142 move plate 141 into the horizontal first position, and when microswitch 65 is actuated—when a metal sheet is clamped by means 32—the means 142 are controlled to move the plates 141 into the vertical second position since the guiding function thereof is no longer necessary.

After the pattern cutting and notching of a metal sheet by the assembly of the present invention, the sheet is moved away from the pattern cutting position by the conveying means 10 (after release of clamping means 32). To facilitate free passage of the pattern cut metal sheet away from the pattern cutting position, and to facilitate removal of the waste material that results from cutting, a roller 145 and waste bin 146 are provided (see FIG. 1 in particular). The roller 145 preferably takes the form of a tube 147 that encircles a shaft 148, the shaft 148 being spring-biased upwardly by spring means 149 or the like, and the tube 147 being loosely disposed with respect to the shaft 148. The roller 145 may be split in the middle if desired in order to allow pivoting of the clamping member 64 out of the way of the path of the sheet metal during discharge, however if there is sufficient clearance between the member 64 and roller 145, this is not necessary. As a cut sheet of metal is moved by the conveying means 10 past member 64, it is engaged by roller 145, and the pattern piece itself may then be held by an operator or by suitable automatic means as the waste pieces go over the end of the roller 145 and drop down into the waste bin 146 or the like. The bin 146 preferably has an apex 150 with slanted walls 151 going therefrom whereby cut pieces of metal will slide down out of the way and for periodic collection.

Figure 6:
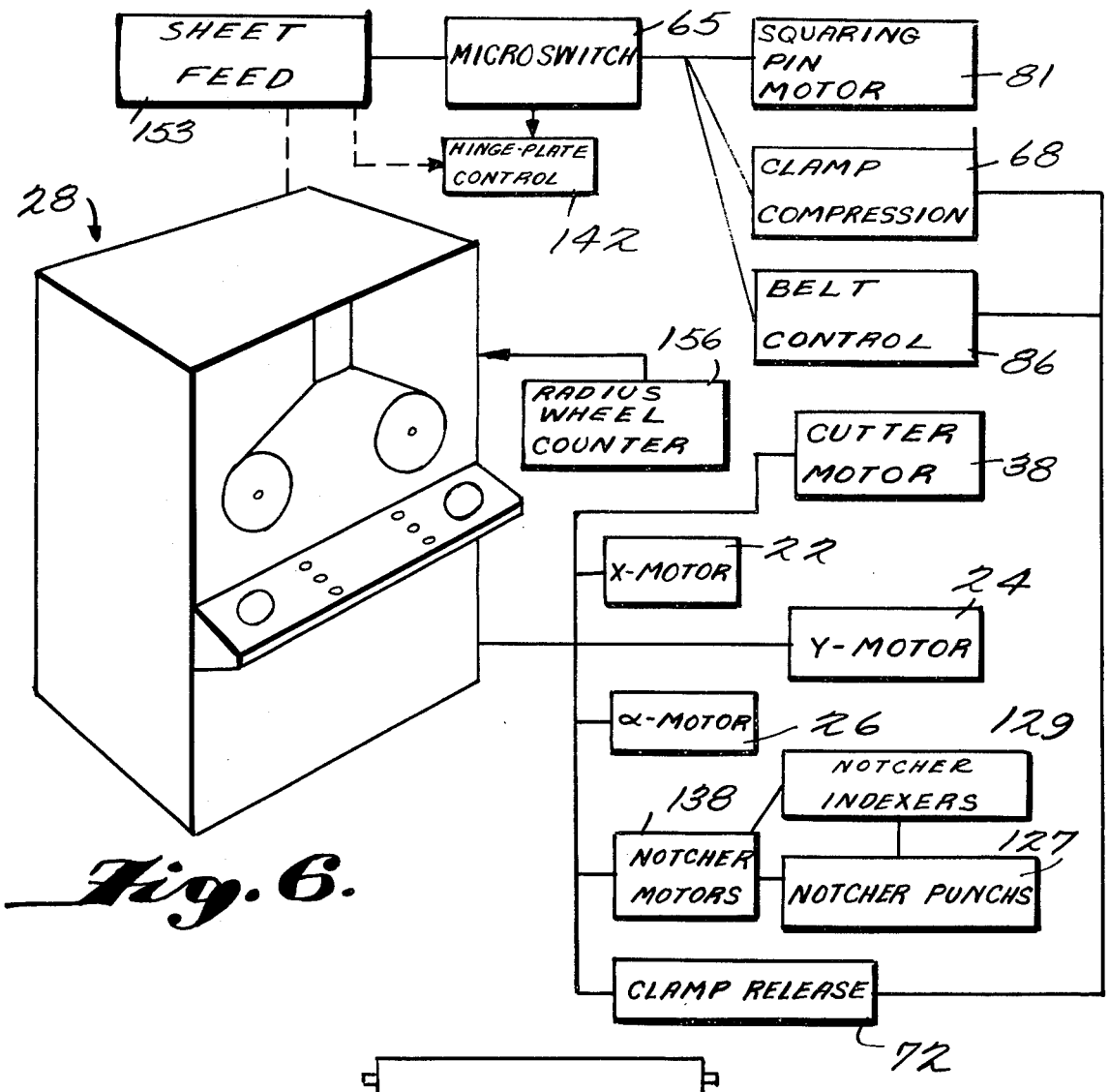
FIG. 6 is a schematic diagram of the interrelationship between controlled and controlling components according to the present invention.

FIG. 6 is a schematic showing of the interrelationship between automatic components of the apparatus of the invention, master control thereof being provided by a computer 28. The details of the computer 28 do not form a part of the present invention since any number of conventional computers may be employed for performing the control functions necessary to practice the invention. The input device may be in the form of a magnetic tape transport mechanism having coded information utilized by the computer 28 thereon, or a wide variety of other inputs may also be employed. The computer 28 directly controls the x, y, α, and notcher motors 22, 24, 26 and 138, respectively, notcher pistons 127, the notcher indexers 129, and the clamp release cylinder 72. Indirect control (or supplementary to manual control) is also provided for clamp compression cylinder 68, conveyor belt motors 86, accessory sheet feed 153 for the sheet cutting assembly, and cutter motor 38.

Figure 7:
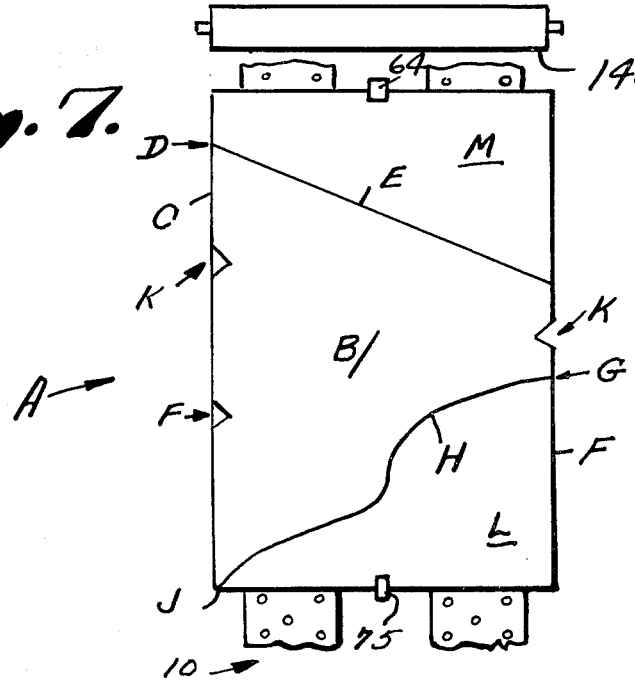
FIG. 7 is a top diagrammatic view of an exemplary metal sheet after pattern cutting thereof according to the present invention.

FIG. 7 is a top diagrammatic showing of a sheet of metal A in pattern cuttiang position that has been cut to form a pattern B. The cutter 14 initially penetrated the edge C of sheet A at point D, cut line E, penetrated edge F at point G, cut curve H, and left the sheet at point J. Notches K were formed by notching assemblies 125, the notches K being punched while the paternn B was being cut. Waste pieces L and M were left.

Apparatus according to the present invention having been set forth, a method of operation thereof will now be described. A sheet A of metal is fed from an accessory feeding means (153) onto conveyor means 10, which means 10 convey the sheet A to a pattern cutting position. The support assembly 112 for guide means 20 and the distance between conveyor belts 84 have been adjusted to accommodate the width of the sheet A to be cut by adjustment with handwheels 97 and 119. The conveying means 10, supporting the sheet A on flexible tips 100 thereof, convey the sheet A until it engages microswitch 65 of clamping means 32, the abutment member 64 preventing further movement of the sheet A in the y-direction. Microswitch 65 cuts off motors 86 powering conveyor belts 84 and operates clamping cylinder 68, firmly clamping the sheet A in position to be pattern cut, as well as operating motor 81 for squaring pin 75 to move pin 75 into abutting engagement with the rear edge of sheet A. The sheet is now held firmly in place by clamp 66, 67, pin 75, guide means 30, and tips 100 of belts 84.

With the sheet A in place, the computer 28 initiates operation of the cutter motor 38 to provide relative scissors-like cutting movement between blades 36, 37, the cutter 14 penetrates on edge (C - FIG. 7) of sheet A, x and y motors 22, 24 being operated by computer 28 to position the cutter 14 at any particular x-y coordinate within the range of supporting means 16, 18 and α motor 26 being operated by computer 28 to orient the blades 36, 37 for cutting in any particular direction at the given x-y coordinate. Notcher motors 138 are operated simultaneously with motors 22, 24 and 26 to position the notchers 125 over selected points along the sheet A, edges C and F to form notches therein, indexer 129 and air punch 127 being operated at each desired position of notcher 125.

Once cutting of the pattern B from sheet A has been completed, computer 28 signals clamp release cylinder 72 and clamp compression cylinder 68, and clamping pressure on sheet A is released, the clamp means 32 is pivoted out of the way of sheet A, belt motors 86 are restarted, and the sheet A is conveyed away from the pattern cutting position thereof over roller 145. The pattern B is held as it passes over roller 145 by an operator or suitable automatic means, and then is passed on for storage or other operations to be performed thereon, the waste portions L and M from sheet A falling into waste bin 146. As the cut pattern B is being conveyed away from the cutter assembly, another sheet A may be conveyed thereto, the computer 28 operating the motors 22, 24, 26, 72, 128, and 81 to get all the component parts in starting position for cutting another sheet A.

While the invention has been herein shown and described in what is presently conceived to be the most practical and preferred embodiment of the invention, it will be apparent to those of ordinary skill in the art that many modifications may be made thereof within the scope of the invention. For instance, while separate sheet feed is preferred, under some circumstances it is possible to feed sheet metal from a roll to the conveying means 10, and cut off the roll at the back portion of the cutter. Also, a radius wheel 155 with counter 156 may be provided associated with cutting means 14 (see FIG. 2a). Such a radius wheel would act as a measuring means and measure the actual length of an arc cut with cutting means 14. If, due to the variations in the length of the metal sheet stock that is used (i.e., slightly shorter pieces are fed than the length of pieces planned for when the computer program was set) a radius is cut that is slightly shorter than needed, the wheel 155 and counter 156 will detect this, and automatically send a signal back to computer 28 (see FIG. 6), which will automatically compensate for such a variation when the next sheet is cut. Other modifications are also possible, thus the invention is to be accorded the broadest interpretation of the appended claims so as to encompass all equivalent structures and methods.

What is claimed is:

1. Automatic sheet metal cutting apparatus for cutting patterns and the like from sheets of metal fed to said apparatus in a feed direction, said apparatus comprising
    a scissors cutting tool means having a pair of blades, one blade being adapted to be disposed above a horizontally arranged metal sheet to be pattern cut, and one blade being adapted to be disposed below said metal sheet,
    conveying means for conveying said metal sheet into a pattern cutting position, said sheet being disposed in a horizontal plane, supporting means being associated with said conveying means for supporting said sheet so that said cutting tool means may cut through an edge thereof when pattern cutting is initiated and may pattern cut said sheet without damaging said conveying means during pattern cutting,
    means for supporting said cutting tool means above said conveying means, in a position wherein said blades will be disposed above and below said sheet in a horizontal plane, and for movement in $x$ and $y$ horizontal directions substantially perpendicular to each other, and allowing access of said cutting tool means to at least one free edge of said sheet,
    means for supporting said cutting tool means for substantially 360° angular, $\alpha$, movement about a vertical axis,
    $x$, $y$, and $\alpha$ motor means for automatically moving said cutting tool means in said $x$, $y$, and $\alpha$ directions,
    computer control means for automatically controlling the operation of said $x$, $y$, and $\alpha$ motors for moving said cutting tool means to cut a desired, preprogrammed pattern from said sheet,
    guide means for guiding movement of said metal sheet into said pattern cutting position,
    clamping means for securely holding said metal sheet stationary at said pattern cutting position during pattern cutting thereof, and
    motor means associated with said cutting tool means for moving sais blades with respect to each other to shear said metal sheet during pattern cutting thereof.

2. Apparatus as recited in claim 1 wherein said conveying means comprises at least one conveyor belt, and wherein said supporting means associated with said conveying means comprises a plurality of spaced tips of flexible material attached to and extending upwardly from said conveyor belt, the top of each tip being spaced from said conveyor belt a distance sufficient to allow receipt of the lower blade of said cutting tool means between said metal sheet and said conveyor belt without damage to said conveyor belt.

3. Apparatus as recited in claim 2 wherein said conveying means comprises a pair of conveyor belts that are relatively movable with respect to each other in a direction transverse of the direction of feed of sheet metal to said apparatus.

4. Apparatus as recited in claim 3 wherein means are provided for moving said conveyor belts with respect to each other, said means comprising a pair of wheeled carriages mounting one of said conveyor belts adjacent one end thereof, a pair of screw-threaded rods, each receivable by a portion of one of said wheeled carriages to transform rotational movement of said rod to linear movement of said wheeled carriage in said direction transverse to the feed direction of said sheet metal, and means for simultaneously rotating each of said screw rods.

5. Apparatus as recited in claim 1 further comprising a notching assembly disposed on either side of a metal sheet received by said apparatus, each notching assembly engaging a side edge of said metal sheet for notching of the edge at predetermined positions as determined by said computer means.

6. Apparatus as recited in claim 5 further comprising first means for mounting each notching assembly for longitudinal movement in a first path along the length of a metal sheet received by said apparatus, and notcher motor means controlled by said computer means for moving said notching assembly in said first path of movement.

7. Apparatus as recited in claim 6 wherein said notching assembly includes a notching piston, a plurality of notching dies, and an indexer for moving a selected one of said plurality of notching dies into operative position under said notching piston, operation of said piston causing depression of said selected die to penetrate the edge of said metal sheet and form a notch of a given shape therein.

8. Apparatus as recited in claim 6 further comprising second means for mounting one of said notching assemblies and said first mounting means thereof for linear movement in a second path in a direction transverse to the direction of movement of said notching assembly in said first path, said one notching assembly and first mounting means being movable in said second path to accommodate metal sheets of different width that might be fed to said apparatus.

9. Apparatus as recited in claim 8 wherein said second mounting means comprises a pair of screw-rods, one passing through an end member at each end of said first mounting means, each end member having a screw-threaded portion thereof for converting rotational movement of a screw-rod into linear movement of said end means, and means for rotating said screw-rods simultaneously.

10. Apparatus as recited in claim 8 wherein said guide means comprise a plurality of guide rollers arranged along the first path of movement of each of said notching assemblies and some of said guide rollers mounted for movement with said one notching assembly in said second path, and means for movement said guide rollers for movment out of the path of movement of said notching assemblies during movement thereof in said first path of movement.

11. Apparatus as recited in claim 1 wherein said guide means comprise a plurality of rollers arranged on either side of a metal sheet received by said apparatus, each of said rollers having a groove formed therein for receipt of said metal sheet therein to provide some vertical support as well as horizontal guiding for said metal sheet.

12. Apparatus as recited in claim 1 wherein said clamping means comprises an abutment member mounted for abutment by the leading edge of said metal sheet as it is fed to said apparatus, said abutment member having a top surface thereof, and a piston mounted below said metal sheet received by said abutment surface for engaging the sheet bottom and forcing the sheet into secure clamping engagement with said top surface of said abutment member.

13. Apparatus as recited in claim 12 wherein said clamping means further comprises a cylinder for movement of said piston to and from clamping engagement with said sheet, and means for mounting said abutment member for pivotal movement about a horizontal axis out of interfering relationship with said metal sheet to allow movement of said metal sheet out of said apparatus in said feed direction after pattern cutting thereof has been completed.

14. Apparatus as recited in claim 12 further comprising a microswitch or the like mounted on said abutment member and responsive to the engagement of said metal sheet with said abutment member, said microswitch operating a cylinder for moving said piston member to clamping engagement with said sheet and substantially simultaneously stopping operation of said conveying means.

15. Apparatus as recited in claim 12 wherein said clamping means further comprises a squaring pin for engaging the back edge of said sheet when in pattern cutting position to assist said abutment member, said guide means, and said conveyor supporting means in holding said metal sheet in proper pattern cutting position, said squaring pin including means for moving said squaring pin in the direction of feed to said metal sheet into said apparatus for accommodating sheets of different length.

16. Apparatus as recited in claim 15 wherein said mounting means for said squaring pin includes a screw-rod elongated in the feed direction of said metal sheet, and a supporting member receiving said screw-rod for transforming rotational movement of said screw-rod into linear movement of said squaring pin, and means for rotating said screw-rod to move said squaring pin in said metal sheet feed direction or opposite to said direction.

17. Apparatus as recited in claim 16 wherein said squaring pin is mounted for pivotal movement in one direction so that a metal sheet being fed into said apparatus pivots it out of its way, but so that it securely abuts the back edge of the metal sheet to be held thereby once moved into abutting engagement therewith.

18. Apparatus as recited in claim 1 wherein said scissors cutting tool means further comprises an arm for mounting the lower of said cutting tool blades and a ball bearing mounted on said arm adjacent the trailing portion of said lower blade, said ball bearing for engaging the bottom surface of said metal sheet to allow for more accurate $\alpha$ turning of said cutting tool.

19. Apparatus as recited in claim 18 wherein said arm is a lever pivotal about a horizontal axis, and wherein said ball bearing is disposed on the opposite side of said pivot as said lower blade member.

20. Apparatus as recited in claim 18 wherein said motor means associated with said cutting tool moves said upper blade linearly in a vertical direction to cooperate with said lower blade to effect shearing of said metal sheet.

21. Apparatus as recited in claim 20 wherein said lower blade is also movable by said cutting means motor to effect shearing of said metal sheet.

22. Apparatus as recited in claim 1 wherein said means for supporting said cutting tool means for $\alpha$ movement about a vertical axis comprises a housing securely mounted to said means for supporting said cutting tool means above said conveying means, and a vertical shaft mounted in bearings of said housing for rotational movement with respect to said housing, said blades of said cutting tool means being connected to said shaft below said housing.

23. Apparatus as recited in claim 22 further comprising a gear mounted to the top of said vertical shaft, and a worm gear in engagement with said gear and operatively connected to said $\alpha$ motor for rotation by said $\alpha$ motor to in turn rotate said vertical shaft.

24. Apparatus as recited in claim 1 wherein said means for supporting said cutting tool means above said conveying means for movement in $x$ and $y$ horizontal directions includes two pair of frame members, one at each of four terminal corners of said apparatus, individual members of each of said pair being connected by a guide rod and at least one of said pairs also being connected by a first screw-rod, a pair of end members, one mounted for movement along each of said guide rods connecting said frame members, at least one of said end members having a screw-threaded portion thereof for receipt of said first screw-rod to transform rotational movement of said first screw-rod into longitudinal movement of said end members, a guide rod connecting said end members, a second screw-rod extending between said end members, and a support for said cutting means, said support receiving said guide rod and having a screw-threaded portion thereof for receipt of said second screw-rod and for transforming rotational movement of said second screw-rod into linear movement of said support member, said $y$ motor being connected to said first screw-rod for rotation thereof, and said $x$ motor being connected to said second screw-rod for rotation thereof.

25. Apparatus as recited in claim 1 further comprising a roller rotatable about a horizontal axis disposed past the end of said conveying means in the feed direction of said metal sheet, said roller for receiving said metal sheet thereon after pattern cutting of said metal sheet.

26. Apparatus as recited in claim 25 further comprising a waste bin disposed substantially below said roller and for receipt of waste portions cut from said metal sheet as the pattern cut from said sheet is held in engagement with said roller to prevent dropping thereof into said waste bin.

27. Apparatus as recited in claim 1 wherein said guide means includes a hinged plate mounted on each side of said metal sheet, and means for moving said hinged plate from a first position wherein it is disposed in a substantially horizontal plane and guides movement of said metal sheet into cutting position, to a second position wherein it is in a generally vertical plane and does not perform a guiding function.

28. Apparatus as recited in claim 1 further comprising a radius wheel or the like, and counter or the like associated therewith, said wheel and counter mounted on said cutting means for measuring the length of arcs and lines cut thereby, said counter being operatively connected to said computer control means for adjusting the control functions thereof in response to variations in arc and line lengths cut by said cutting means.

29. Automatic sheet metal cutting apparatus for cutting patterns and the like from sheets of metal fed to said apparatus in a feed direction, said apparatus comprising
a nibbler having a punching portion for penetrating a horizontally disposed sheet of metal to cut a pattern therefrom by successive penetration of said metal sheet from the top surface thereof, said nibbler having a plate connected thereto and cooperating with said punching portion, a vertically-extending connecting portion adjacent said punching portion connecting said plate to said nibbler, said plate for disposition below said metal sheet to be cut by said punching portion, conveying means for conveying a sheet of metal to be pattern cut into a pattern cutting position, said sheet being disposed in a horizontal plane, and supporting means being associated with said conveying means for supporting said sheet so that said nibbler may pattern cut said sheet without damaging said conveying means during pattern cutting, said conveying means comprising at least one conveyor belt, and said supporting means associated with said conveying means comprising a plurality of spaced tips of flexible material attached to and extending upwardly from said conveyor belt, the top of each tip being spaced from said conveyor belt a distance sufficient to allow receipt of the plate of said nibbler between said metal sheet and said conveyor belt without damage to said conveyor belt, said plate operating to cam spaced tips out of interference with said nibbler punching portion, means for supporting said nibbler above said conveying means for movement in $x$ and $y$ horizontal directions substantially perpendicular to each other, means for supporting said nibbler for substantially 360° angular, $\alpha$, movement about a vertical axis, $x$, $y$, and $\alpha$ motor means for automatically moving said nibbler in said $x$, $y$, and $\alpha$ directions, computer control means for automatically controlling the operation of said $x$, $y$, and $\alpha$ motors for moving said nibbler to cut a desired preprogrammed pattern from said sheet, guide means for guiding movement of said sheet of metal to be pattern cut into said pattern cutting position, clamping means for securely holding said metal sheet stationary at said pattern cutting position during pattern cutting thereof, and motor means associated with said nibbler for moving said nibbler punching portion up and down to penetrate said metal sheet to cut a pattern therefrom.

30. Apparatus as recited in claim 29 further comprising a notching assembly disposed on either side of a metal sheet received by said apparatus, each notching assembly engaging a side edge of said metal sheet for notching of the edge at predetermined positions as determined by said computer means.

* * * * *